United States Patent [19]

Nagino et al.

[11] Patent Number: 5,582,198
[45] Date of Patent: Dec. 10, 1996

[54] BIDIRECTIONAL VALVE AND FUEL SHUT-OFF DEVICE

[75] Inventors: Yoshihiro Nagino, Inazawa; Hiroshi Nishi, Nagoya, both of Japan

[73] Assignee: Toyoda Gosei Co., Ltd., Japan

[21] Appl. No.: 426,947

[22] Filed: Apr. 21, 1995

[30] Foreign Application Priority Data

Apr. 28, 1994 [JP] Japan ..................... 6-113845

[51] Int. Cl.⁶ ................................... F16K 17/36
[52] U.S. Cl. ................ 137/43; 137/202; 137/493.6
[58] Field of Search .................... 137/43, 202, 493.6

[56] References Cited

U.S. PATENT DOCUMENTS

| | | |
|---|---|---|
| 4,000,828 | 1/1977 | Crute et al. . |
| 4,679,581 | 7/1987 | Mears . |
| 4,905,726 | 3/1990 | Kasugai et al. . |
| 4,913,303 | 4/1990 | Harris .................... 137/43 X |
| 5,028,244 | 7/1991 | Szlaga . |
| 5,156,178 | 10/1992 | Harris . |
| 5,402,818 | 4/1995 | Kasugai .................. 137/43 X |

FOREIGN PATENT DOCUMENTS

60-184779  9/1985  Japan .

*Primary Examiner*—Stephen M. Hepperle
*Attorney, Agent, or Firm*—Cushman Darby & Cushman, Intellectual Property Group of Pillsbury, Madison & Sutro, L.L.P.

[57] ABSTRACT

A fuel shut-off device in which easier assembly and improved air-tight sealing can be achieved. A partition wall plate is ultrasonically welded to a fixing steplike portion of a case body to form an air-tight bidirectional valve chamber comprising the partition wall plate and the case body. The bidirectional valve chamber accommodates a bidirectional valve composed of a positive pressure valve mechanism and a negative pressure valve mechanism. A negative pressure valve member of the negative pressure valve mechanism and a negative pressure spring are formed into an integral structure with a positive pressure valve member of the positive pressure valve mechanism. The positive pressure valve member is formed into an integral structure with the partition wall plate by the engagement of an engaging ring-shaped member of a valve receiving member and an engaging arc-shaped member of the partition wall plate. These form a sub-assembly which is passed through an opening of the case body at the lower end and assembled to the case body from one direction. This completes the accommodation of the bidirectional valve.

19 Claims, 4 Drawing Sheets

BIDIRECTIONAL VALVE AND FUEL SHUT-OFF DEVICE

BACKGROUND OF THE INVENTION

1. Field of the Invention

The invention relates to a bidirectional valve and a fuel shut-off device. In particular, the invention relates to a bidirectional valve for passing gasoline vapor in two directions and a fuel shut-off device placed in a fuel tank for passing gasoline vapor between the fuel tank and an external device such as a canister in both directions while at the same time preventing outflow of liquid fuel to the external device.

2. Description of Related Art

Hitherto, a bidirectional valve like the valve disclosed in Japanese Patent Laid-Open No. 60-184,779 has been disposed between the fuel tank and the canister. The bidirectional valve helps protect the fuel tank as the vapor pressure therein rises or falls. A conventional bidirectional valve will be described with reference to FIG. 5. The conventional bidirectional valve 200 has: (1) a partition 206 that divides the inside of a case body 202 into an upper valve chamber 203 and a lower valve chamber 204, (2) a check valve 210 provided in the upper valve chamber 203 which is sealed by a cover member 212, and (3) a diaphragm valve 220 provided in the lower valve chamber 204 which is sealed by a cover member 222.

Figure 5:
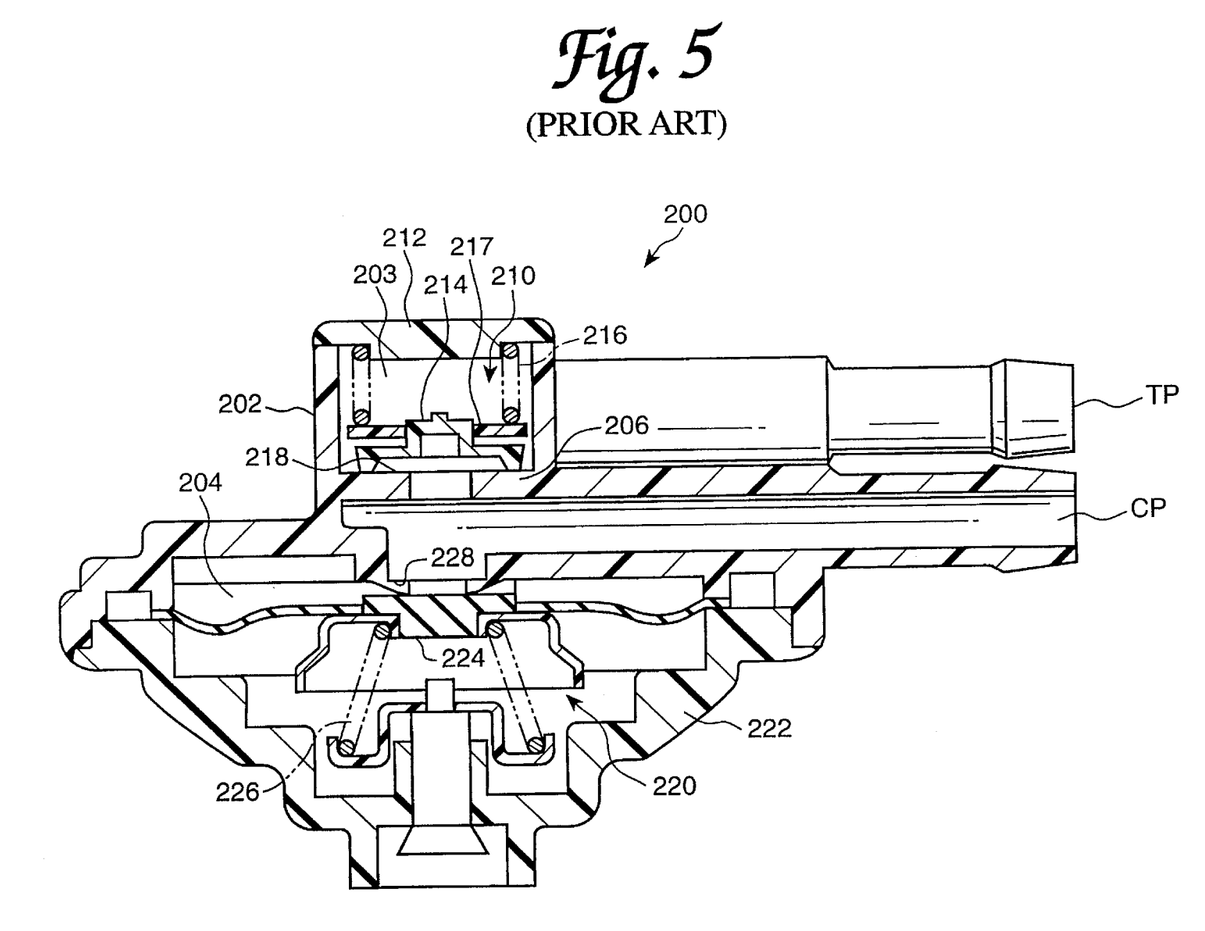
FIG. 5 is a cross sectional view of a conventional bidirectional valve.

In this conventional construction, a rise in the internal pressure of the fuel tank to above atmospheric pressure and in excess of a predetermined amount causes an increase in pressure at tank port TP adjacent to the tank. Hence, the pressure on the diaphragm valve 220 of lower valve chamber 204 increases through a path (path not shown). In turn, this causes the valve body 224 to oppose spring 226 and open away from a valve seat surface 228, allowing fuel vapor to escape from the fuel tank to the canister.

On the other hand, when the internal pressure of the fuel tank has dropped so that the pressure difference between the tank port TP and the canister port CP becomes greater than a predetermined value, the valve body 214 of the check valve 210 opposes the spring 216 through a spring receiving member 217 and opens away from a valve seat surface 218. This allows fuel vapor to return from the canister to the fuel tank.

In general, a conventional bidirectional valve 200 having the above-described construction and function is used together with a fuel shut-off device. The fuel shut-off device prevents outflow of liquid fuel from the fuel tank while at the same time allowing fuel vapor to be discharged from the fuel tank to external devices such as canisters (refer to Japanese Patent Laid-Open No. 4-228,321). In this case, the tank port TP of the bidirectional valve 200 must be connected to a fuel vapor discharging path of a fuel shut-off device by means of an oil proof hose.

In the aforementioned conventional bidirectional valve 200, the check valve 210 is assembled through an opening in the upper valve chamber 203, while the diaphragm valve 220 is assembled through an opening in the lower valve chamber 204. Therefore, it is necessary to assemble the check valve 210 and the diaphragm valve 220 from different directions. Assembly becomes complicated because the diaphragm valve 220 can be assembled only after the check valve 210 is completed and the valve body 214 has been turned over.

In the bidirectional valve 200, the openings of the upper valve chamber 203 and the lower valve chamber 204 must be sealed air-tightly. Therefore, it is necessary to seal carefully the openings of the upper valve chamber 203 and the lower valve chamber 204 with cover members. This is very troublesome.

However, a fuel shut-off device that could be combined together with the bidirectional valve 200 would be advantageous. Integration of the tank port TP of bidirectional valve 200 and the fuel vapor discharging path of the fuel shut-off device means that a connecting hose does not have to be used. However, if the fuel shut-off device and the bidirectional valve 200 are formed into a combined structure with the bidirectional valve 200, the fuel shut-off device must also be turned over, making assembly of such a structure difficult.

SUMMARY OF THE INVENTION

It is therefore an object of the present invention to provide a bidirectional valve which is both easy to assemble and provides an excellent air-tight seal. In addition, it is desirable to make possible easier assembly of a fuel shut-off device that allows fuel vapor to pass in both directions but prevents liquid fuel from flowing out of the fuel tank.

Toward this end, the present invention provides for a bidirectional valve. The essential characteristics of the bidirectional valve are: (1) a case body (housing) having a first connecting port which opens to the outside, and an opening at one end, (2) a partition wall, which covers the aforementioned opening, forms a valve chamber with the case body and has formed therein a second connecting port (orifice) which opens to an exterior, and (3) the valve chamber having accommodated therein a first valve mechanism, which opens with a rise in pressure at the second connecting port, and a second valve mechanism, which opens with a rise in pressure at the first connecting port.

The first valve mechanism comprises: (1) a first valve member that is slidably retained in the valve chamber such that the first valve member can move toward or away from the partition wall and can cover the second connecting port by coming to rest on the second connecting port, and (2) a first valve member spring that is incorporated in the valve chamber and forces the first valve member toward the partition wall. The first valve member has formed therein a communicating hole that permits communication between the first and second connecting ports.

The second valve mechanism comprises: (1) a second valve member that is slidably retained between the first valve member and the partition wall such that it can move toward or away the first valve member and can cover from the side of the partition wall the communicating hole formed in the first valve member, and (2) a second valve member spring that forces the second valve member toward the first valve member.

On the partition wall, an engaging member is provided to engage the first valve member in the valve chamber, thereby allowing the first valve member to move only a predetermined distance from the partition wall prior to such engagement.

The present invention also provides for a fuel shut-off device. The fuel shut-off device can be disposed in a fuel tank to allow fuel vapor to pass between the fuel tank and an external device such as, for example, a canister in two directions but prevent outflow of liquid fuel to the external device.

When it is used in the fuel shut-off device of the present invention, the bidirectional valve of the present invention can include the first connecting port for connection to an external device such as, for example, a canister.

The fuel shut-off device can also include a lower chamber forming member that forms a lower chamber. The lower chamber forming member is formed adjacent to the aforementioned opening in the case body and below the partition wall. The lower chamber forming member has an outermost opening disposed opposite the aforementioned opening so that the partition wall can be inserted from the outermost opening toward the opening of the case body. The lower chamber forming member allows fuel vapor and fuel liquid to flow from the fuel tank to the lower chamber.

The fuel shut-off device of the present invention can also include a float valve contained in the lower chamber and able to cover the second connecting port of the partition wall by moving in response to liquid fuel flowing into the lower chamber.

In the bidirectional valve having the above-described construction, the first valve member of the first valve mechanism, which is contained in the valve chamber formed by the case body and the partition wall, is forced by the first valve member spring toward the partition wall. The first valve member rests over the second connecting port in the partition wall, thereby covering this port. Accordingly, an increase in the pressure at the second connecting port causes the first valve member to oppose the first valve member spring, thereby causing the first valve member to open away from the partition wall and uncover the second connecting port. Therefore, the fuel vapor will pass from the second connecting port through the valve chamber to the first connecting port. The second valve member of the second valve mechanism is also subjected to the increase in pressure at the second connecting port. However, the second valve mechanism remains closed because the pressure acts in the same direction as the force of the second valve member spring.

On the other hand, the communicating hole in the first valve member is covered by the second valve member from the partition wall side because the second valve member of the second valve mechanism is forced by the second valve member spring toward the first valve member. Therefore, when the pressure at the first connecting port increases, the increased pressure opposes the second valve member spring. This causes the second valve member to move away from the first valve member, thereby opening the first valve mechanism and uncovering the communicating hole in the first valve member. Therefore, the fuel vapor is passed from the first connecting port through the communicating hole in the first valve member in the valve chamber to the second connecting port. Here, increased pressure of the first connecting port also acts upon the first valve member of the first valve mechanism. However, the first valve mechanism remains closed because the increased pressure acts in the same direction as the force of the first valve member spring.

In the bidirectional valve of the present invention, which allows passage of fuel vapor in both directions in such a manner, the first valve member of the first valve mechanism engages the engaging holding member formed at the partition wall, and the first valve member is allowed to move toward or away by a predetermined distance from the partition wall. Although allowed to move, the first valve member is supported by the partition wall and cannot fall away from the partition wall. In other words, even if the partition wall is turned such that the first valve member is below, although the first valve member is capable of moving vertically toward and away from the partition wall, the engaging holding member will not allow the first valve member to fall off from the partition wall.

On the other hand, the second valve member of the second valve mechanism is accommodated in the valve chamber such that it can move between the first valve member and the partition wall toward or away from the first valve. It is forced toward the first valve member by the second valve member spring (or elastic member). For this reason, the second valve member is pushed against the first valve member from the partition wall side, thereby covering the communicating hole in the first member from the partition wall side. The second valve member is hence united with the first valve member. In other words, the second valve mechanism itself is united with the first valve member of the first valve mechanism as a result of integrating the second valve member with the first valve member of the first mechanism.

Accordingly, with the partition wall not covering the opening of the case body, the partition wall is combined with the first valve member of the first valve mechanism and the second valve mechanism by combination of the second valve mechanism, itself, and the first valve member of the first valve mechanism, and integration of the first valve member of the first valve mechanism and the partition wall by means of the first valve member engaging holding member. The first valve member spring of the first valve mechanism, which is incorporated in the valve chamber, urges the first valve member toward the partition wall, which means that it is disposed between the bottom of the case body and the first valve member. For this reason, accommodation of the first valve mechanism and the second valve mechanism in the case body to complete the bidirectional valve requires, first, incorporation of the first valve member spring of the first mechanism through the opening of the case body, assemblage of the partition wall made into an integral structure with the first valve member of the first valve mechanism and the second valve mechanism, and air-tight covering of the opening of the case body with the partition wall. As a result, because the bidirectional valve is air-tightly sealed only at one opening of the case body by the partition wall, improved air-tight sealing can be achieved by reducing the number of places which must be sealed.

The fuel shut-off device of the present invention includes the previously described bidirectional valve, in which the second connecting port, formed in the partition wall, is made to face the lower chamber formed by the lower chamber forming member below the partition wall. Accordingly, an increase in pressure at the second connecting port due to a forcible inflow of fuel vapor from the fuel tank to the lower chamber causes the first valve mechanism in the bidirectional valve of the fuel shut-off device to open, whereby the second connecting port is uncovered. This causes the fuel vapor to be discharged from the fuel tank through the second connecting port and the first connecting port to the external device. On the other hand, an increase in pressure of the first connecting port causes the aforementioned second valve mechanism in the bidirectional valve of the fuel shut-off device to open, whereby the communicating hole of the first valve member is uncovered. This introduces fuel vapor from the external device through the first connecting port and the communicating hole of the first valve member in the valve chamber, through the second connecting port and the lower chamber, to the fuel tank.

Since inflow of fuel liquid to the lower chamber causes the float valve to move up, the float valve causes the second connecting port of the partition wall to be covered, which results in prevention of outflow of fuel to the valve chamber of the bidirectional valve through the second connecting port, and to the external device.

In the fuel shut-off device, which allows fuel vapor to be passed between the external device and the fuel tank in both directions and which shuts off the fuel, the outermost opening of the lower chamber forming member, formed below the partition wall of the bidirectional valve, is positioned opposite the opening of the case body adjacent to the bidirectional valve. The partition wall of the bidirectional valve can be inserted into the lower chamber from the outermost opening toward the opening of the case body. Therefore, incorporation of the bidirectional valve to complete the assembly of the fuel shut-off device requires, first, incorporation of the first valve member spring of the first valve mechanism through the outermost opening of the lower chamber forming member from the opening of the case body in the case body, assembly of the partition wall, formed into an integral structure with the first valve member of the first valve mechanism and the second valve mechanism to the opening of the case body, and air-tight sealing of the case body opening with the partition wall. Thereafter, the float is accommodated in the lower chamber.

PREFERRED EXEMPLARY EMBODIMENT OF THE INVENTION

A description will be made of the preferred embodiments of the bidirectional valve and the fuel shut-off device of the present invention with reference to the drawings.

Figure 1:
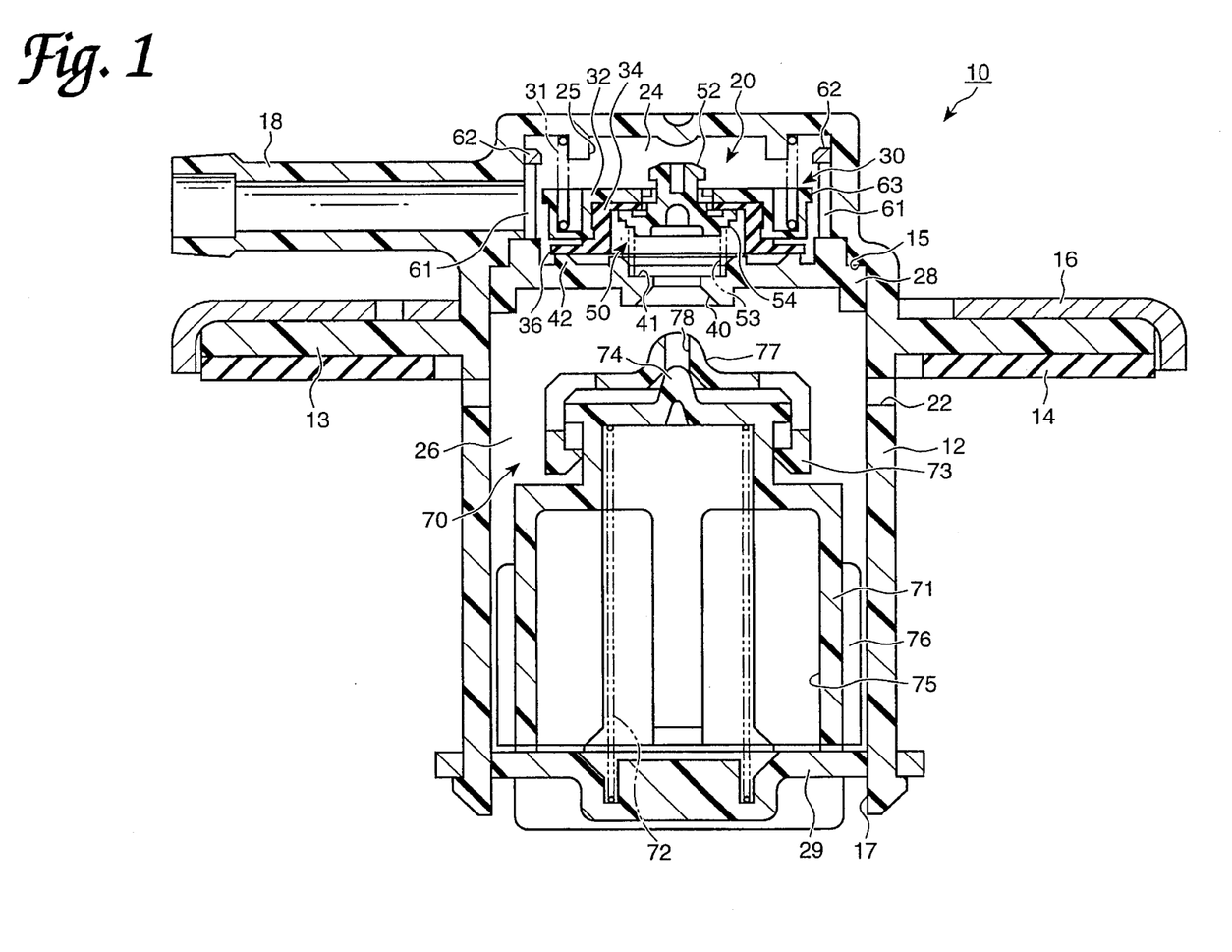
FIG. 1 is a cross-sectional view of fuel shut-off device according to the present invention.

As illustrated in the cross sectional view of FIG. 1, fuel shut-off device 10 of a first embodiment includes a bidirectional valve 20 (which can, among other uses, be employed in a fuel shut-off valve mechanism) and fuel shut-off valve mechanism 70 which are accommodated in a substantially cylindrical case body 12.

The case body 12 can be made of oilproof resin such as, for example, polyacetal or nylon. The case body 12 has a bottom with an opening at its lower end to which a cover 29 is put on. The center outer walls of case body 12 are formed with flanges 13. Packings seals 14 are disposed between the upper end wall of the fuel tank (fuel tank not illustrated) and these flanges 13. Flanges 13 are fixed to the fuel tank by means of receiving plates 16. When the flanges 13 are fixed to the fuel tank in such a way, the portions below these flanges 13 are located in the fuel tank, while the portions above flanges 13 are located out above the fuel tank. The portions located above and outside this fuel tank serve as bidirectional valve 20, whereas the fuel shut-off valve mechanism 70 is incorporated into the portions located in the fuel tank.

A connection port 18 for connection to a canister (canister not shown) is formed in the cylindrical wall of the case body 12 above the flange section 13. In addition, a plurality of vapor holes 22 are formed in the walls below the flange section 13 to allow liquid fuel in the fuel tank and fuel vapor thereof to flow into the fuel shut-off device.

A partition wall plate 28 is preferably ultrasonically welded onto fixing step-like sections 15 adjacent to the bottom of the case body 12. The partition wall plate 28 divides the case body 12 interior into a bidirectional valve chamber 24 and a lower float chamber 26. Accordingly, the joint between the case body 12 is airtightly sealed by the partition wall plate 28 at the fixing step-like sections 15 which correspond to internal openings of the case body 12. The partition wall plate 28 can be made of the aforementioned oil-proof resin used for the case body 12. The partition wall plate's outer edge is formed such that it can be fitted and adhered to the fixing step-like sections 15 of the case body 12. A cover member 29, made of the aforementioned oil-proof resin, engages to and is fixed to the lower end opening 17 of the case body 12 to seal the case body.

A description will be made of the structural members which are assembled in the case body 12. The bidirectional valve 20, and the fuel shut-off valve mechanism 70 are composed from the structural members.

First, a description will be made of the valve mechanism, specifically the positive pressure valve mechanism 30, and the negative pressure valve mechanism 50, which are both accommodated in bidirectional valve chamber 24 of case body 12 (see FIGS. 1 and 2). Here, the positive pressure valve mechanism 30 is used for adjusting the internal pressure of the tank by discharging fuel vapor from the fuel tank to the canister when the internal pressure of the fuel tank has risen and the float 71 is not moving upward. The negative pressure valve mechanism 50 is used for adjusting the internal pressure of the fuel tank by introducing fuel vapor into the fuel tank from the canister when the internal pressure of the fuel tank has dropped. In other words, the positive pressure valve mechanism 30 and the negative pressure mechanism 50 together comprise bidirectional valve 20. Bidirectional valve 20 is placed between the canister and the fuel tank, and both valve mechanisms function to adjust the internal pressure of the fuel tank.

Figure 2:
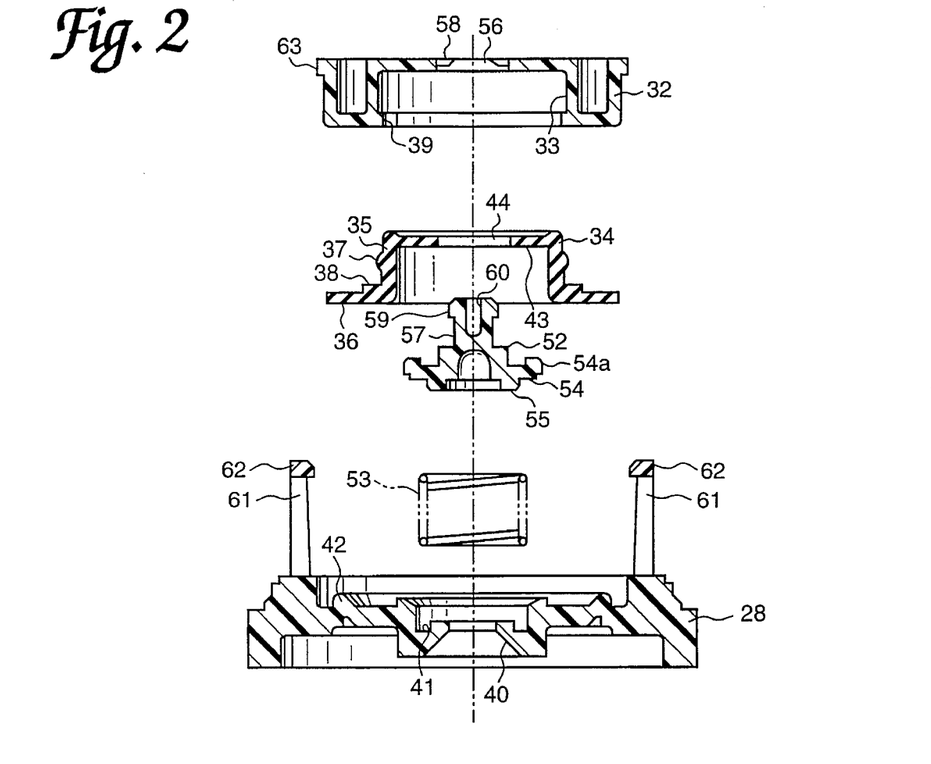
FIG. 2 is an exploded cross-sectional view of the positive and negative pressure valve mechanisms 50.

As shown in FIGS. 1 and 2 (FIG. 2 is an exploded view of FIG. 1), the positive pressure valve mechanism 30 comprises: (a) a positive pressure spring 31 (or an elastic member) mounted from the lower portion of a protrusion 25 formed at the upper end face of the bidirectional valve chamber 24, (b) a valve receiving member 32 made of the aforementioned oil-proof resin and is forced downward by this positive pressure spring 31, and (c) a positive pressure valve member 34 that is fitted and fixed to this valve receiving member 32. In the positive pressure valve member 34, a flat ring-shaped seal member 36 is formed adjacent to an opening edge section of a cup-shaped fitting body section 35. An inner ring-shaped protrusion 39 at the open end of recess 33 at the lower end central part of valve receiving member 32 is fitted between the ring-shaped protrusion 37, formed at the peripheral wall of this fitting body section 35, and a thick base section 38 of the seal member 36. The positive valve member 34 is fitted and secured to the valve receiving member 32 such that the fitting body section 35 of the valve member 34 is fitted into the recess 33 of the valve receiving member 32.

This arrangement allows the positive pressure valve member 34 to be forced by the positive pressure spring through the valve receiving member 32, and move freely up and down in the bidirectional valve chamber 34 whenever the valve receiving member 32 opposes the positive pressure spring 31. The positive pressure valve member 34 moves toward or away from the partition wall plate 28. The positive pressure valve member 34 can be made of, for example, nitrile rubber or fluoro-rubber.

A through hole 40, that can communicate with the lower float chamber 26, is formed at the center of the partition wall plate 28 and positioned opposite the positive pressure valve member 34. A spring receiving step-like section 41 is formed on the upper surface of the partition wall plate 28 such that it surrounds the through hole 40 (see FIG. 2). A ring-shaped positive pressure side seal protrusion 42 is formed concentrically with the through hole 40 at the top surface of the partition wall plate 28. Accordingly, the positive pressure valve 34 is forced by the positive pressure spring 31, so that the seal member 36 is pushed against the positive pressure side seal protrusion 42 formed on the top surface of the partition wall plate 28, whereby the through hole 40 is sealed.

Accordingly, the positive pressure valve mechanism 30 opens or closes depending on the balance of pressure between (a) the bidirectional valve chamber 24 having disposed therein positive pressure valve member 34 and having pressure at the canister side exerted through port 18), wherein the pressure is further determined by the urging force of the positive pressure spring 31, and (b) the lower float chamber 26, having internal pressure of the fuel tank. That is, the positive pressure valve member 34 is pushed downward causing seal member 36 to rest on the positive pressure side seal protrusion 42, whereby the positive pressure valve mechanism 30 shuts the bidirectional valve chamber 24, or in other words, the portion between the canister and the lower float chamber 26.

When there is an increase in the internal pressure of the fuel tank, the internal pressure is exerted through hole 40 of the partition wall plate 28 onto the lower surface of the positive pressure valve member 34. If the pressure from the fuel tank is greater than the pressure of the canister side in bidirectional valve chamber 24, and if the internal pressure from this fuel tank is large enough to overcome the urging force of the positive pressure spring 31, then the positive pressure valve member 34 opposes the positive pressure spring 31, and the positive pressure valve member 34 is pushed upward. Therefore, the seal member 36 of the positive pressure valve member 34 moves away from the positive pressure side seal protrusion 42, and the positive pressure valve mechanism 30 is switched to an open state. The bidirectional valve chamber 24 and lower float chamber 26 henceforth communicate with each other via hole 40. As a result, the positive pressure valve mechanism 30 opens when the difference between the internal pressure in the fuel tank and the pressure in the canister exceeds a predetermined value. The fuel vapor in the fuel tank passes through the vapor hole 22 through lower float chamber 26, through hole 40, and finally through port 18 out to the canister. This allows the fuel shut-off device 10 to reduce the internal pressure in the fuel tank.

As shown in FIGS. 1 and 2, the negative pressure valve mechanism 50 functions as a valve in conjunction with (a) bottom plate section 43 of fitting body section 35 in the positive valve member 34 of the aforementioned positive pressure valve mechanism 30 and (b) its communicating hole 44 in the center thereof. Negative pressure valve mechanism 50 has the following structure. The negative pressure valve mechanism 50 comprises (a) negative pressure valve member 52 made of the aforementioned oil-proof resin, and (b) negative pressure spring 53 (or elastic member) for forcing upward this negative pressure valve member 52. A flat ring-shaped flange member 54 is formed at the lower end of the negative valve member 52. A ring-shaped negative pressure side seal protrusion 54a protrudes out from the peripheral edge of the flange member 54 toward bottom surface plate section 43. A protrusion 55 is formed at the lower end of the negative pressure valve member 52 for mounting negative pressure spring 53. The upper end of the negative pressure valve member 52 is defined as an insertion cylindrical section 57 that is inserted into a guide hole 56 formed in the center of the valve receiving member 32. Valve receiving member 32 is provided with gaps, as explained below.

Figure 3:
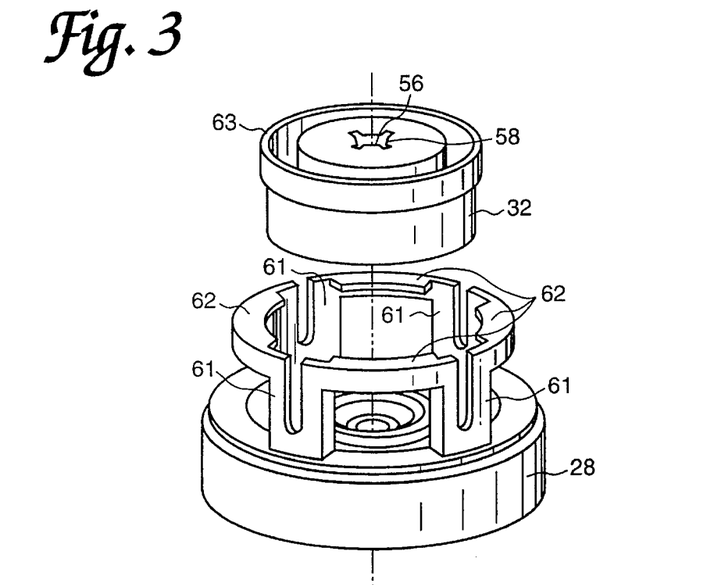
FIG. 3 is a partially assembled perspective view of the partition wall plate and valve receiving member.

As shown in the perspective view of FIG. 3, guide hole 56 in the valve receiving member 32 is formed into a special shape by four stop members 58 formed along the boundary of the guide hole 56. Stop engaging member 59, which engage stop members 58 formed around guide hole 56, is formed at the upper end of the insertion cylindrical section 57 of the negative pressure valve member 52. Engagement of stop members 58 and stop engaging members 59 allows insertion cylindrical section 57 to be in an inserted state in the guide hole 56, thereby avoiding unintentional removal of the negative pressure valve member 52 from the guide hole 56. The flange member 54 is positioned between the positive pressure valve member 34 and partition wall plate 28. A slit 60 is formed in the upper end of the insertion cylindrical section 57 for bringing the stopping members 59 close together when inserting the insertion cylindrical section 57 into the guide hole 56 and engaging the stopping members 58 and the stopping engaging members 59.

The negative pressure spring 53 is disposed around protrusion 55 for mounting the negative pressure valve member 52 and the spring receiving step-like section 41 of the partition wall plate 28. Negative pressure spring 53 is interposed between the flange member 54 of the negative pressure valve member 52 and the partition wall plate 28 in a somewhat compressed state. The negative pressure spring 53 forces the negative pressure valve member 52 upward. Therefore, the negative pressure valve member 52 moves toward or away from the positive valve member 34 as governed by the force exerted by the negative pressure spring 53. The negative pressure valve member 52 is forced by the negative pressure spring 53, which causes the negative pressure side seal protrusion 54a of the flange member 54 to be pushed against the bottom plate section 43 of the positive pressure valve member 34, whereby the communicating hole 44 in the positive pressure valve member 34 is sealed. The diameters of the guiding hole 56 and the communicating hole 44 are selected to allow smooth vertical movement of the negative pressure valve member 52.

Consequently, with the positive pressure valve mechanism 30 in a closed state, as shown in FIG. 1, the negative pressure valve mechanism 50 opens and closes based on the balance of pressure between (a) the bidirectional valve chamber 24 having the negative pressure valve member 52 interposed therein (pressure at the canister side exerted through port 18), pressure determined by the force of negative pressure spring 53, and (b) the lower float chamber 26 having fuel tank internal pressure. That is, the negative pressure valve member 52 is pushed upward, which causes the negative pressure side seal protrusion 54a to come to rest at the bottom plate section 43, whereby the negative pressure valve mechanism 50 closes the bidirectional valve chamber 24 or the portion between the canister and the lower float chamber 26.

A drop in the internal pressure of the fuel tank is effectively exerted onto the lower surface of the flange member 54 of the negative pressure valve member 52 through hole 40 of the partition wall plate so that the pressure adjacent to the canister in the bidirectional valve chamber 24 becomes relatively high. If the force based on the pressure difference thereof is large enough to overcome the force of the negative pressure spring 53, the negative pressure valve member 52 opposes the negative pressure spring 53 as it is pushed downward. As a result, the negative pressure side seal protrusion 54a of the negative pressure valve member 52 moves away from the bottom plate section 43 of the positive pressure valve member 34, whereby the negative pressure valve mechanism 50 is in an open state. The bidirectional valve chamber 24 and the lower float chamber 26 now communicate with each other via communicating hole 44 and hole 40. Consequently, the negative pressure valve mechanism 50 opens when the internal pressure of the fuel tank drops creating a pressure difference with the pressure adjacent to the canister (negative pressure difference) that equals a predetermined value. The fuel vapor passes from the canister to port 18, through bidirectional valve chamber 24, communicating hole 44, through guiding hole 56, through hole 40, lower float chamber 26, and finally through vapor hole 22 into the fuel tank. This allows the fuel shut-off device 10 to adjust the internal pressure in the fuel tank by raising the pressure in the fuel tank. That is, the bidirectional valve 20, composed of both the positive pressure valve 30 and the negative pressure valve mechanism, allows the fuel vapor to pass in both directions between the canister and the fuel tank, thereby regulating the internal pressure in the fuel tank to a predetermined pressure.

As shown in FIGS. 1, 2, and 3, four two-legged supports 61 are vertically positioned at equal distances apart on the partition wall plate 28 such that they surround the valve receiving member 32. Four flat arc-shaped engaging members 62 are disposed between adjacent two-legged supports 61. Each of the arc-shaped engaging members 62 is held by the four two-legged supports 61 which are disposed at predetermined distances apart on the partition wall plate 28, so as to limit the vertical strokes of the valve receiving member 32 of the positive pressure valve member 34 above the partition wall plate 28. In addition, an engaging ring-shaped member 63 is formed at the outer peripheral wall edge of the valve receiving member 32 to engage the arc-shaped member 62. The outer diameter of the engaging ring-shaped member 63 and the inner diameter of the inner curved section of the two-legged supports 61 are selected so that the vertical movement of the valve receiving member 32 above the partition wall plate 28 is not hindered. When incorporating the valve receiving member 32 into the partition wall plate 28, each of the engaged arc-shaped members 62 will be moved outwardly thereby widening a gap provided between the leg portions of the two-legged supports 61, so that incorporation of the valve receiving member 32 to the upper surface of the partition wall plate 28 is not hindered.

A description will be made of the fuel shut-off valve mechanism 70 contained in the lower float chamber 26 of the case body 12 with reference to FIG. 1. The fuel shut-off valve mechanism 70 functions to avoid unintentional flow of liquid fuel from the fuel tank to the canister even when there is a change in the liquid level of the fuel tank resulting from, for example, a sudden overturning of the vehicle.

The fuel shut-off valve mechanism 70 comprises a main float 71 made of the aforementioned oil-proof resin. The main float 71 moves up and down in the lower float chamber 26 based on changes in the liquid fuel level of the fuel tank. A spring 72 forces this main float 71 upward. A subfloat 73 engages the upper end of the main float 71 but is capable of moving up and down with respect to the main float. Hence, the fuel shut-off valve mechanism 70 is constructed as a two-layered float valve.

Spring 72 helps reduce the effective density of the main float 71 by exerting an upward force on main float 71. The force exerted by the spring is designed so that when there is no liquid fuel inflow to the lower float chamber 26, the main float 71 rests against spring 72 under its own weight until it contacts the cover member 29.

The front end of the main float 71 is formed into a main valve protrusion 74 which is sealed. Spring accommodating chamber 75 is formed in the main float 71 to accommodate spring 72. Guide members 76 are formed at a constant distance at the outer peripheral surface such that a predetermined clearance with respect to the inner peripheral surface of the case body 12 is provided, when main float 71 has been incorporated into the lower float chamber 26.

There is formed at the front end of the sub-float 73 a subvalve protrusion 77, which closely contacts the inner peripheral tapered face of the through hole 40 in the partition wall plate 28 when the sub-float moves up along with the main float 71 in the lower float chamber 26. A through hole 78 is formed in the center of the subvalve protrusion. The through hole 78 is sealed by the main valve protrusion 74 when the main float 71 has moved up.

Accordingly, when liquid fuel first flows into the lower float chamber 26, the main float 71 moves up and the main valve protrusion 74 of the main float 71 seals the through hole 78 in the sub-float 73. Thereafter, the main float 71 and the subfloat 73 move up as an integrated whole. With the through hole 78 sealed, the sub-valve protrusion 77 of the sub-float 73 moves into and contacts closely the through hole 40 in the partition wall plate 28. This close contact seals the through hole 40 in the partition wall plate 28. The fuel shut-off valve mechanism 70 prevents liquid fuel inflow to the canister via the through hole 40 by the aforementioned series of processes. Because the main float 71 is guided in the lower float chamber 26 by guide members 76, the sub-valve protrusion is capable of moving into and contacting closely the through hole 40 with good precision. Fuel shutoff can occur even when the fuel shut-off valve mechanism 70 is turned over as a result of, for example, a car accident.

When liquid fuel has flowed back from the lower float chamber 26 into the fuel tank, the main float 71 initially moves down and through hole 78 is opened. The main valve protrusion 74 also moves down along with the main float 71 so that the sub-valve protrusion 77 moves away from the through hole 40. Upon opening of the through hole 78, fuel vapor is passed in both directions by the aforementioned bidirectional valve 20, whereby the internal pressure in the fuel tank is adjusted.

A description will be made of the assembly of the bidirectional valve 20 composed of the aforementioned positive pressure valve mechanism 30 and negative pressure valve mechanism 50 and the fuel shut-off valve mechanism 70 in the case body 12. The assembly processes will be described in turn.

Referring to FIG. 2, before assembling the bidirectional valve 20 or the fuel shut-off valve mechanism 70, the positive pressure valve member 34 and the valve receiving member 32 are formed into a combined structure and secured with each other so as to form the structure shown in FIG. 1. With the stopping members 58 engaging the stopping engaging members 59, the negative pressure valve member 52 is made integral with the valve receiving member 32 such that the flange member 54 is positioned below the bottom plate section 43. Next, with the negative pressure spring 53 positioned at the spring receiving step-like section 41 of the partition wall plate 28, the valve receiving member 32, and the negative pressure valve member 52 and the positive pressure valve member 34 formed into an integral structure, the valve receiving member 32 is pushed into the region which is surrounded by each of the engaging arc-shaped members 62 of the partition wall plate 28. Here, the engaging ring-shaped member 63 of the valve receiving member 32 is passed by the engaging arc-shaped members 62 by spreading apart the gap between the leg portions of the two-legged supports 61. After it has passed by the engaging arc-shaped members 62, the engaging arc-shaped members 62 will engage the ring-shaped member 63, whereby the vertical stroke of the valve receiving member 32 is blocked and thereby restricted. Therefore, the negative pressure valve member 52, negative pressure spring 53, both of which comprise the negative valve mechanism 50, and the valve receiving member 32 and the positive valve member 34, both of which comprise the positive pressure valve mechanism 30, are interfitted with the partition wall plate 28. With this, the sub-assembly of the positive pressure valve mechanism 30 and the negative pressure valve mechanism 50 is completed.

Upon completion of the sub-assembly of the positive and negative valve mechanisms, the valve receiving member 32, negative pressure valve member 52, etc., will not separate from the partition wall plate 28. Accordingly, even if the subassembly is turned over so that the valve receiving member 32 is at the bottom, assembly thereafter will not be hindered, and handling will be made easier. When the valve receiving member 32 is pushed by the engaging arc-shaped members 62, the negative pressure spring 53 has its upper end fitted to the protrusion 55 used for mounting the negative pressure valve member 52.

Upon completion of the sub-assembly of the positive and negative valve mechanisms, the case body 12 is placed in a predetermined jig (jig not illustrated) so that the lower end opening 17 in the case body 12 faces upwardly. Then, through the lower end opening 17 in the case body 12, the positive pressure spring 31 is positioned and inserted beside the protrusion 25 adjacent to the bidirectional valve chamber 24 (see FIG. 1). Next, the aforementioned subassembly is inserted from the lower end opening 17 toward the side of the case body 12 with the bottom. The sub-assembly on the partition wall plate 28 is fitted to the fixing step-like section 15 of the case body 12. Thereafter, an ultrasonic welder (welder not illustrated) is used to ultrasonically weld the partition wall plate 28 airtightly to the fixing step-like section 15. In this way, the positive pressure valve mechanism 30 and the negative pressure valve mechanism 50 are assembled in the bidirectional valve chamber 24 of the case body 12. Obviously, the aforementioned processes can be carried out by placing the case body 12 sideways or by placing the bidirectional valve chamber 24 side at the top.

After the partition wall plate 28 has been welded, the valve receiving member 32 of the positive pressure valve mechanism 30 is urged by the positive pressure spring 31, so that the seal member 36 of the positive pressure valve member 34 comes to rest on the positive pressure side seal protrusion 42 at the upper surface of the partition wall plate 28. The negative pressure side seal protrusion 54a of the flange member 54 of the negative pressure valve mechanism 50 comes into contact with the bottom surface plate section 43 between the aforementioned subassembly by means of negative pressure spring 53.

In assembling fuel shut-off valve mechanism 70, after partition wall plate 28 has been welded ultrasonically to the case body 12, main float 71 having main valve protrusion 74, is inserted into lower float chamber 26 through the lower end opening 17 in the case body 12. Then, after spring 72 has been inserted into spring accommodating chamber 75, cover member 29 is put on the lower end opening 17 of the case body 12 and engaged and secured thereto. This completes the assembly of the fuel shut-off valve mechanism 70 into lower float chamber 26.

As described above, in assembling the fuel shut-off device 10 of the embodiment, the structural members can all be assembled from one direction through the lower end opening 17 in the case body 12. For this reason, the fuel shut-off device 10 of the embodiment can be assembled simply and easily. In addition, before assembling the fuel shut-off device 10, the positive pressure valve member 34 of the positive pressure valve mechanism 30, the valve receiving member 32, the negative pressure valve mechanism 50, and the partition wall plate 28 can be formed into an integrated sub-assembly, so that assemblage can be further simplified and made more easier.

Ultrasonic welding of the partition wall plate 28 completes the required sealing of all the sealing locations. The sealing locations are not exposed to the outside of the case body 12. Accordingly, in the fuel shut-off device 10 of the embodiment, excellent air-tight sealing can be achieved.

The same desired functioning as that of the conventional fuel shut-off device can be obtained with the present invention. The fuel shut-off device 10 of the embodiment prevents unintentional liquid fuel outflow to the canister can even when the liquid fuel level in the fuel tank changes significantly as a result of, for example, a sudden overturning of a vehicle or a running of the vehicle. In addition, the internal pressure in the fuel tank can be adjusted by the bidirectional valve 20, which is composed of positive pressure valve mechanism 30 and negative pressure valve mechanism 50 and allows fuel vapor to be passed in both directions.

In the above-described embodiment, a description was made of the fuel shut-off device 10 having bidirectional valve 20. Even if only bidirectional valve 20 is included in the construction, this bidirectional valve 20 provides excellent airtight sealing. In addition, this construction makes possible simple and easy assembly.

Although a description was made of an embodiment of the invention, it is apparent to those skilled in the art that the invention is not limited to such an embodiment but can be otherwise variously embodied without departing from the spirit and scope of the invention.

Figure 4:
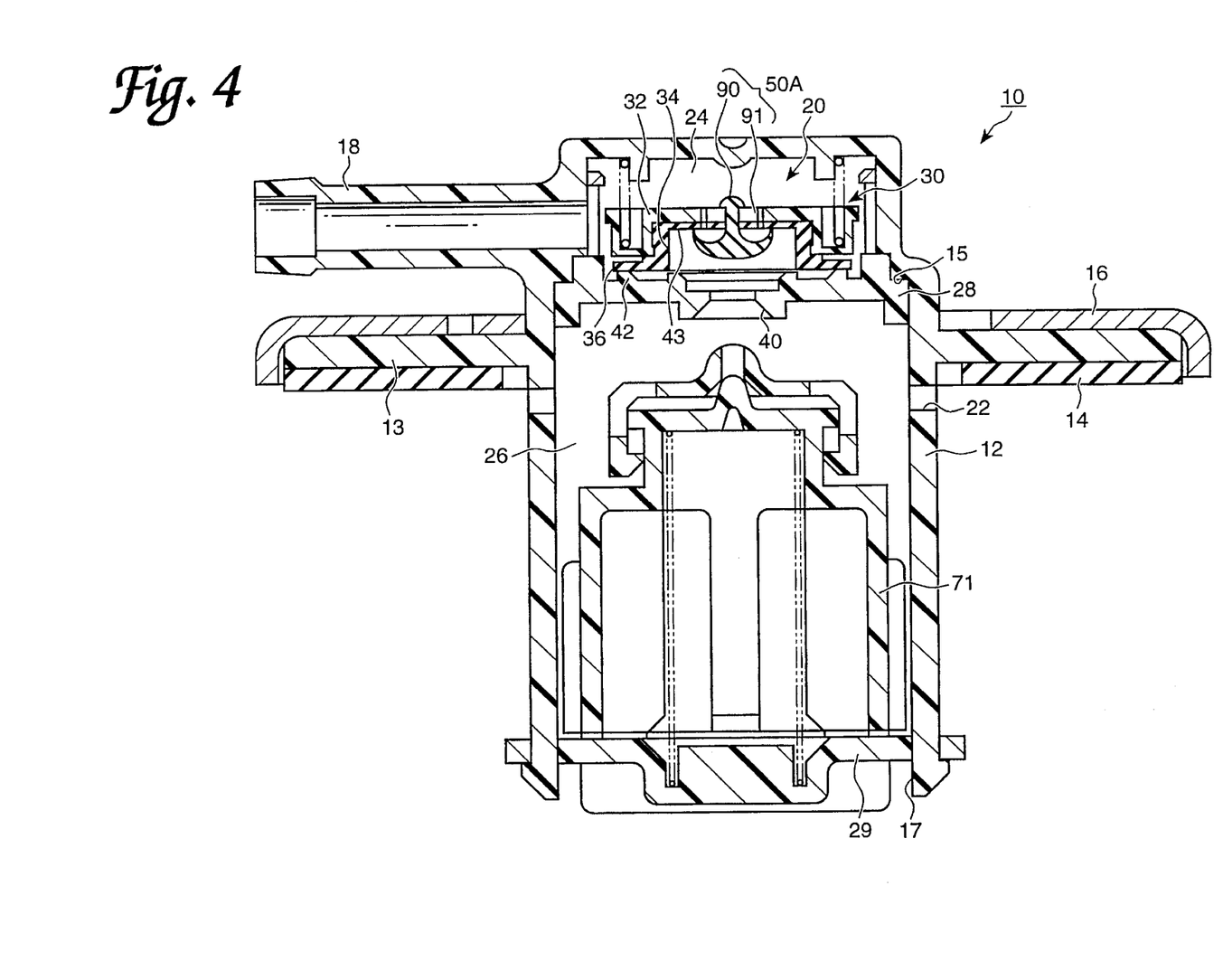
FIG. 4 is a cross sectional view of a modification of the fuel shut-off device according to the present invention.

For example, the negative pressure valve mechanism 50 can be formed into a so-called umbrella-shaped valve. That is, as shown in FIG. 4, an umbrella-shaped valve 90 can be fitted and secured to positive pressure valve member 34 having sealing member 36 and valve receiving member 32 such that the umbrella-shaped section is disposed opposite a through hole 40, with holes 91 formed in places in the positive pressure valve member 34 and valve receiving member 32 which are covered by the umbrella section of the umbrella-shaped valve 90. The negative pressure valve mechanism 50A is constructed such that these holes 91 are covered by the umbrella-shaped valve 90. Even with this negative pressure valve mechanism 50A, based on the pressure balance of the bidirectional valve chamber 24 and the lower float chamber 26 between which is interposed the umbrella section of the umbrella-shaped valve 90, the internal pressure of the fuel tank can be adjusted in the same way as with the negative pressure valve mechanism 50 described above. Such a construction allows elimination of the negative pressure valve 52, negative pressure spring 53, etc., resulting in a simplified construction. When the negative pressure valve mechanism is constructed in such a manner, the umbrella-shaped valve 90, itself, causes the umbrella section to be urged toward the bottom plate section 43 of the positive pressure valve member 34 due to the shape of the umbrella-shaped section or its flexibility. Accordingly, in this embodiment, the umbrella-shaped valve 90 is the second valve member and the second valve member urging means.

In the above-described embodiment, the negative pressure spring 53 is incorporated between the negative pressure valve member 52 and the partition wall plate 28 so that the negative pressure spring 53 is forced upward toward the positive pressure valve member 34. However, the construction is not limited thereto. For example, the negative pressure spring 53 can be of such a diameter as being interposable between the upper surface of the valve receiving member 32 of the positive pressure valve mechanism 30 and stopping engaging members 59 of the negative pressure valve member 52, and the negative pressure valve member 52 can be designed so that it is pulled upward toward the positive pressure valve member 34.

As described in detail above, in the bidirectional valve as claimed presently, integration of the first valve member of the first member mechanism with the partition wall, and these with the second valve mechanism, and incorporation of the first valve member spring of the first valve mechanism from one direction through the opening of the case body allows assembly of the first valve member of the first mechanism and the second valve mechanism, formed into an integral structure, to the partition wall. Only one opening in the case body needs to be covered air-tightly by the partition wall. Consequently, according to the bidirectional valve claimed presently, it is possible to realize simplified and easier assembly, and a more reliable air-tight sealing.

In the fuel shut-off device claimed presently, air-tight covering is achieved by the partition wall alone used in the bidirectional valve of FIG. 1, so that the bidirectional valve and the float valve can be assembled from one direction through the outermost opening in lower chamber forming member forming the lower chamber. Consequently, according to the fuel shut-off device claimed presently, based on the bidirectional valve used, it is possible to achieve a more simple and easier assembly, and a more reliable air-tight sealing.

The positive pressure valve opening pressure is approximately 2 kPa. The negative pressure valve opening pressure is approximately 0.6 kPa.

A bidirectional valve and a fuel shut-off device has been described in Japanese Patent Application No. H06-113845 filed Apr. 28, 1994, the complete disclosure of which is incorporated herein by reference.

What is claimed is:

1. A bidirectional valve comprising:
a housing having a first opening and a first exit port provided therein and spaced apart from each other;
a partition wall covering said first opening, said housing and said partition wall enclosing a valve chamber in open communication with said first exit port, said partition wall having a first orifice therein that allows communication between said valve chamber and the exterior of said valve chamber;
a valve assembly mounted within said valve chamber, said valve assembly comprising first and second valve members both of which are yieldably held in a normally closed position, said first valve member having a second orifice therein,
wherein said second valve member is operatively associated with said second orifice to open or close said second orifice, and said first valve member is operatively associated with said first orifice to open or close said first orifice, said first and second valve members opening or closing in response to pressure changes within either said exterior of said valve chamber or within said valve chamber,
wherein said partition wall further includes an engaging member that limits the vertical movement of said first valve member and is able to engage said first valve member.

2. A bidirectional valve according to claim 1, wherein said partition wall further includes a sealing member positioned against said first valve member in said normally closed position.

3. A bidirectional valve according to claim 2, wherein said sealing member is a protrusion.

4. A bidirectional valve according to claim 1, wherein said engaging member does not permit said first valve member to move past said engaging member during said vertical movement.

5. A bidirectional valve according to claim 1, wherein said housing further encloses said exterior to form a second chamber below said partition wall.

6. A bidirectional valve according to claim 5, wherein said housing has a second opening to allow liquids to flow into said second chamber.

7. A bidirectional valve according to claim 6, wherein said second chamber has a float therein, said float having a lower position and an upper position and said float arranged to close said first orifice in response to said liquid flow sufficient to raise said float from said lower position to said upper position.

8. A bidirectional valve according to claim 7, wherein said float comprises a main float and a sub-float.

9. A bidirectional valve according to claim 1, wherein said first valve member is slidably retained in said valve chamber.

10. A bidirectional valve according to claim 1, wherein said first valve member is yieldably held by an elastic member.

11. A bidirectional valve according to claim 10, wherein said elastic member forces said first valve member toward said partition wall in said first valve member's normally closed position.

12. A bidirectional valve according to claim 11, wherein said second valve member is yieldably held by a second elastic member.

13. A bidirectional valve according to claim 1, wherein said second elastic member forces said second valve member toward said first valve member in said second valve member's normally closed position.

14. A bidirectional valve according to claim 12, wherein said first valve member comprises a first backing member and a second seal member.

15. A bidirectional valve according to claim 1, wherein said second valve member is an umbrella-shaped valve.

16. A bidirectional valve according to claim 1, wherein said partition wall includes an outer periphery sealed tightly to said housing.

17. A bidirectional valve according to claim 1, wherein said housing further has a third opening below said first opening, said third opening allowing said partition wall to be inserted therethrough.

18. A fuel shut-off device comprising the bidirectional valve according to claim 6, wherein said housing further encloses said exterior to form a second chamber below said partition wall, said housing having a second opening to allow liquids to flow into said second chamber, said second chamber having a float therein, said float having a lower position and an upper position, and said float arranged to close said first orifice in response to said liquid flow sufficient to raise said float from said lower position to said upper position.

19. A fuel shut-off device according to claim 6, wherein said housing further has a third opening below said first opening, said third opening allowing said valve assembly, said partition wall, and said float to be inserted therethrough.

* * * * *